United States Patent [19]

Santo

[11] Patent Number: 5,185,233
[45] Date of Patent: Feb. 9, 1993

[54] METHOD OF OPTICAL RECORDING EMPLOYING FREE RADICALS

[75] Inventor: Tsuyoshi Santo, Kawasaki, Japan

[73] Assignee: Canon Kabushiki Kaisha, Tokyo, Japan

[21] Appl. No.: 693,038

[22] Filed: Apr. 30, 1991

Related U.S. Application Data

[60] Division of Ser. No. 368,142, Jun. 13, 1989, abandoned, which is a continuation of Ser. No. 36,460, Apr. 9, 1987, abandoned.

[30] Foreign Application Priority Data

Apr. 11, 1986 [JP] Japan ................................ 61-082272
Apr. 11, 1986 [JP] Japan ................................ 61-082273

[51] Int. Cl.$^5$ .......................... G03C 1/76; G03C 1/00
[52] U.S. Cl. ................................. 430/270; 430/495; 430/945; 346/135.1
[58] Field of Search ............... 430/270, 495, 945, 964; 346/135.1

[56] References Cited

U.S. PATENT DOCUMENTS

| | | | |
|---|---|---|---|
| 2,346,090 | 4/1944 | Staehle | 430/339 |
| 3,104,973 | 9/1963 | Sprague et al. | 430/339 |
| 3,298,833 | 1/1967 | Gaynor | 430/290 |
| 3,514,288 | 5/1970 | Silver | 430/916 |
| 3,936,530 | 2/1976 | Morgan | 430/945 |
| 4,032,691 | 6/1977 | Kido et al. | 428/304 |
| 4,230,939 | 10/1980 | De Bont et al. | 430/945 |
| 4,371,602 | 2/1983 | Iwasaki et al. | 430/152 |
| 4,622,284 | 11/1986 | West et al. | 430/945 |
| 4,626,496 | 12/1986 | Sato | 430/945 |
| 4,957,854 | 9/1990 | Oguchi et al. | 430/945 |

FOREIGN PATENT DOCUMENTS 59-225993 12/1984 Japan .

OTHER PUBLICATIONS

English translation of Japanese Patent No. 58-179,693, 12 pages, published Oct. 20, 1983.

*Primary Examiner*—Charles L. Bowers, Jr.
*Assistant Examiner*—John S. Y. Chu
*Attorney, Agent, or Firm*—Fitzpatrick, Cella, Harper & Scinto

[57] ABSTRACT

There is disclosed an optical recording medium capable of high-density information recording by photo-thermal converting effect or by effectively absorbing a visible or near-infrared light such as a laser beam and converting the same into thermal energy to enable high-density optical information recording and reproduction with a low-energy laser beam, and a recording method utilizing such optical recording medium.

9 Claims, 2 Drawing Sheets

METHOD OF OPTICAL RECORDING EMPLOYING FREE RADICALS

This application is a division of application Ser. No. 07/368,142 filed Jun. 13, 1989, which is a continuation of application Ser. No. 07/036,460 filed Apr. 9, 1987, both applications now abandoned.

BACKGROUND OF THE INVENTION

1. Field of the Invention

The present invention relates to an optical recording medium for high-density information recording by photothermal converting effect, and a recording method utilizing said recording medium.

2. Related Background Art

A photothermal conversion recording medium employed as an optical disk, an optical card or the like can record information at a high density in the form of circular or spiral tracks of optically detectable small spots, for example 1 microns in size, formed in a thin photothermal conversion recording layer provided on a substrate. The information recording on such disk is achieved by scanning the surface of the recording layer with a focused laser beam to form pits, only in the surface irradiated with said laser beam, in the form of spiral or circular tracks. The recording layer is capable of forming optically detectable spots by absorbing the laser energy. For example, in the heat mode recording method, a laser sensitive layer absorbs the laser energy irradiated thereon to convert said energy into thermal energy thereby forming a small pit by evaporation or deformation, or a small spot, which is optically detectable by the difference in oxidation, reflectance or density, through a chemical reaction.

The information thus recorded is detected by scanning the track with a laser beam to read the optical changes between the pit portions and the pit-free portions. As an example, the track is scanned with a laser beam, and the energy reflected by the recording medium is monitored by a photodetector. Said photodetector provides a low output when the pit is not formed, but provides a high output when the pit is formed because the laser beam is more strongly reflected by the underlying substrate.

For such recording medium there have been principally proposed inorganic substances, for example thin metal layers such as evaporated aluminum layer, a thin bismuth layer, a thin tellurium oxide layer or amorphous chalcogenide glass layers. However such thin layers are generally not obtained by coating but have to be prepared by sputtering or vacuum evaporation, and, for this reason, they are expensive. In addition they are associated with other drawbacks such as a high reflectance to the laser beam, a high heat conductivity, and a low efficiency of laser beam utilization.

Recently compact, inexpensive and directly modulatable semiconductor lasers have been developed as laser light source, but such semiconductor lasers generally have an oscillation wavelength longer than 700 nm, and are generally weaker in power than gas laser such as argon laser or helium-neon laser. Thus, for achieving photothermal conversion recording with such semiconductor laser, the laser sensitive layer should preferably has an absorption peak at a long wavelength, generally in a region from 700 to 850 nm.

However, conventional photothermal conversion recording media do not have sufficient efficiency for converting the laser light energy into thermal energy. For example, in case of an optical disk, the photothermal conversion recording layer principally composed of the aforementioned inorganic substances cannot show a high sensitivity because such layer has a high reflectance to the laser beam and cannot effectively utilize the laser beam. Also a sensitive wavelength range in excess of 700 nm will complicate the layer structure of the laser sensitive layer. For these reasons there have been developed organic compounds capable of showing a change in response to the optical energy of a relatively long wavelength. There are already known compounds sensitive to the laser beam of a wavelength in excess of 700 nm, such as pyrylium compounds disclosed in the U.S. Pat. No. 4,315,983 or in the Research Disclosure 20517 (1981.5), and squalium dyes disclosed in J. Vac. Sci. Technol. 18(1), Jan./Feb. 1981, p. 105–109.

However, an organic compound having an absorption at a long wavelength generally requires a sensitivity at least of 100 mJ/cm$^2$ for a laser beam of a wavelength of 830 nm in order to obtain a sufficiently high S/N ratio, and a higher powered laser beam is required for achieving a high speed scan recording in order to increase the transfer rate of the data. Thus the sensitivity of the laser sensitive laser should be improved in consideration of the service life of the hardware. However there have not been developed organic compounds of a sensitivity sufficient for such purpose.

SUMMARY OF THE INVENTION

In consideration of the foregoing, an object of the present invention is to provide an optical recording medium allowing high-density data recording with a high sensitivity and optical data reading.

Another object of the present invention is to provide an optical recording medium having a high sensitivity to the recording light of visible and infrared wavelength region.

A further object of the present invention is to provide an optical recording method allowing high-speed and high-density recording.

According to an aspect of the present invention, there is provided an optical recording medium for information recording and reading by projecting light to a recording layer formed on a substrate, wherein said recording layer comprises a dye compound capable of absorbing the recording light, and a compound selected from a free radical generating compound capable of generating free radical through decomposition by the heat generated by the absorption of the recording light by the dye compound and a gas generating compound capable of generating gas through decomposition by said heat.

According to another aspect of the present invention, there is provided an optical recording method which comprises projecting a recording layer light onto an optical recording medium, provided with a recording layer containing a dye compound capable of absorbing said recording light and a free radical generating compound capable of generating free radicals through decomposition by the heat generated by the absorption of the recording light by the dye compound, thereby the free radicals generated by said free radical generating compound act to fade the color of said dye compound and thus forming a record.

According a further aspect of the present invention, there is provided an optical recording method which comprises projecting a recording laser light onto an optical recording medium, provided with a recording layer containing a dye compound capable of absorbing the recording light and a gas generating compound capable of generating gas through decomposition by the heat generated by the absorption of the recording light by the dye compound, thereby forming a record in the form of pits in said recording layer.

DETAILED DESCRIPTION OF THE PREFERRED EMBODIMENTS

The optical recording medium of the present invention, for information recording and reading by projecting a light beam onto a recording layer formed on a substrate, is featured by a fact that said recording layer contains a dye compound for absorbing the recording light, a free radical generating compound capable of generating a free radical through decomposition by the heat generated as the result of light absorption by said pigment compound, and a gas generating compound capable of generating gas through decomposition by said heat.

In the following the present invention will be clarified in greater detail. In the following explanation, the quantities are represented by percent by weight or parts by weight, unless otherwise specified.

FIGS. 1 to 4 are cross-sectional views showing different embodiments of the optical recording medium of the present invention.

At first there will be explained a case in which the compound existing in the recording layer together with the dye compound is a free radical generating compound.

Figure 1:
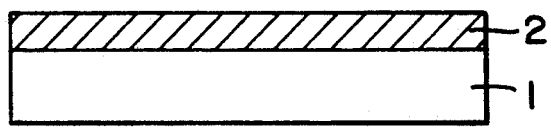
FIGS. 1 to 4 are cross-sectional views of different embodiments of the optical recording medium of the present invention.

The optical recording medium of the present invention, shown in FIG. 1, is composed of a sheet-shaped or board-shaped substrate 1 and a recording layer 2 which is formed thereon and which contains a dye compound and a free radical generating compound capable of causing color fading by thermal free radicals in response to a light for example from a laser, a halogen lamp or a xenon lamp.

The substrate 1 in the present invention can be composed of an already known film- or board-shaped substrate. Preferred examples of such substrates are glass, metal, ceramics, paper and synthetic resins such as polymethyl methacrylate, polycarbonate or polyethylene terephthalate.

Also there can be employed various conventional substrates other than those mentioned above.

However, for achieving a precise color fading recording by recording light there is preferably employed a substrate with satisfactory dimensional precision and surface smoothness. Also in case the medium is exposed to the light through the substrate, it is preferably composed of a material transparent to said recording light.

The recording layer 2 at least contains a dye compound capable of absorbing the recording light, preferably having an absorption maximum in the vicinity of the wavelength of the recording light having the wavelength of ±100 nm, for example within a range of ± nm of said wavelength, and a free radical generating compound capable of generating free radicals by the heat generated as the result of light absorption by the dye compound. The recording layer may additionally contain other components such as decomposition accelerator, binder, dispersant, oil, plasticizer, filler etc.

The thickness of said recording layer 2 is preferably in a range of 0.01 μm to 20 μm, but is preferably as thin as possible, as long as there can be stably obtained a thin layer having sufficient light absorption to the recording light for thermal free radical generation and sufficient light reflection to the reading light.

The aforementioned dye compound having an absorption maximum in the vicinity of the wavelength of the recording light should be suitably selected in consideration of the wavelength of the light to be employed. Examples of such compound include azo, stilbene and phthalocyanine direct dyes including cyanine, merocyanine, triphenylmethane, naphthoquinone, xanthene, squalium, azulene, methyne and pyrylium families or the like; acid dyes of azo, anthraquinone, triphenylmethane, xanthene and azine families; basic dyes of cyanine, azo, azine, triphenylmethane, azulene, methyne and pyrylium families; mordant dyes of azo, anthraquinone, xanthene and triphenylmethane families; acid mordant dyes; vat dyes of anthraquinone and indigoid families; oil-soluble dyes of azo, anthraquinone, phthalocyanine and triphenylmethane families; sulfide dyes; metal complexes of dithiol family; and mixtures thereof.

The content of said dye compound in the recording layer is in a range of 40 to 99.99%, preferably 50 to 99.9%, since a content lower than 40% cannot provide sufficient light absorption for thermal free radical generation and sufficient light reflectance for the reproducing light, while a content exceeding 99.99% cannot provide an improvement in the sensitivity due to an insufficient content of the free radical generating compound.

The free radical generating compound, for generating free radicals by decomposition with the heat generated by the absorption of the recording light by the dye compound, should be suitably selected in consideration of the decomposition temperature, decomposition speed or the like. Examples of such free radical generating compound include azo compounds such as azo-bis-isobutyronitrile (AIBN), p-bromobenzene diazohydroxide, triphenylmethylazobenzene and diazobenzoyl; diacryl peroxides such as benzoyl peroxide; dialkyl peroxides such as tert-dibutyl peroxide; hydroperoxides such as cumene hydroperoxide and tert-butylhydroperoxide; sulfur compounds such as tetramethylthiuram disulfide, dibenzothiazolyl sulfide and xanthogenate esters; benzoin compounds such as α-alkyl substituted benzoins and benzoin alkylethers; carbonyl compounds such as diacetylbenzophenone and Michler's ketones; halogenides such as carbon tetrabromide and sulfonyl chloride; reducing dyes such as eosin and methylene blue; organometallic compounds such as tetraethyl lead, diethyl zinc and diethyl cadmium; persulfates such as potassium persulfate; trialkyl borons; N-nitrosoacyl anides; tetraphenylsuccinonitrile; and the mixtures thereof.

The content of said free radical generating compound in the recording layer is selected within a range of 0.01 to 60%, preferably 0.1 to 50%, since a content less than 0.01% cannot provide a sufficient improvement in the sensitivity due to the insufficient number of resulting free radicals, while a content exceeding 60% cannot provide a sufficient temperature increase in the recording layer in response to the recording layer because of the low content of said dye compound in the recording layer, though said temperature increase depends on the absorption coefficient of said dye compound in the coated layer to the recording light.

The free radical reaction of the free radical generating compound in the present invention takes place in the following manner. When said compound reaches a certain temperature by the heat generated by the absorption of the recording light by the dye compound, the excited molecules rapidly decompose to free radicals each having an odd electron or return to the original state by emitting light or heat. The free radical monomers thus formed by thermal decomposition are attached to the molecules of the dye compound to form a starting material of chain free radicals. Then a growing reaction takes place by successive addition of the dye compound to a free radical present at the end of a molecular chain formed by the preceding additions of the dye compound, and this reaction continues to the formation of a macromolecule unless the free radicals are dissipated by a recombination of a pair of chain radicals or by a heterogenizing reaction involving the movement of a hydrogen atom. This reaction destroys the conjugate system of the dye compound, causing its color to fade. This chain polymerization is extremely effective because a desired reaction can be attained by a suitable selection of the dye compound and the free radical generating compound.

A suitable additive material may be added in order to control the decomposition temperature of said free radical generating compound. Examples of such additive material for lowering the decomposition temperature include zinc compounds such as zinc white, zinc caprylate, zinc nitrate and fatty acid soap of zinc; lead compounds such as lead carbonate, lead phthalate, lead phosphite and lead stearate; cadmium compounds such as cadmium caprylate, cadmium capronate, cadmium laurate, cadmium myristate and fatty acid soap of cadmium; urea; borax; and ethanolamine.

Also examples of the additive material for suppressing the decomposition include organic acids such as maleic acid and fumaric acid; halogenated organic acids such as stearoyl chloride and phthaloyl chloride; organic acid anhydrides such as maleic anhydride and phthalic anhydride; polyhydric alcohols such as hydroquinone and naphthalene diol; carbohydrates such as d-maltase; nitrogen containing compounds such as aliphatic amines, heterocyclic amines, amides and oximes; sulfur containing compounds such as thiols, mercaptanes, sulfides, sulfonic acid, sulfoxides and isocyanates; ketones such as cyclohexanone and acetylacetone; aldehydes; phosphates, phosphites; 6,6-dimethylfulvene; hexachlorocyclopentadiene; and dibutyltin maleate.

A reducing amine may also be suitably added as a sensitizer, in order to prevent deactivation of the free radical by oxygen. Examples of such sensitizer include dimethylaminoethyl methacrylate, n-butylamine, triethylamine, triethyl-n-butylphosphine, and isoamyl 4-dimethylaminobenzoate.

In the present invention, the recording layer can be formed on the substrate by various methods such as coating or vapor deposition. In case of coating, the dye compound and the free radical generating compound are dissolved or dispersed in an organic solvent and applied onto the substrate. A binder may be added in the recording layer, in consideration of the film forming property and the stability of the coated layer. The organic solvent is suitably selected according to whether to dissolve or to disperse said dye compound and free radical generating compound, but can be generally selected from an alcohol such as methanol, ethanol, iso-propanol, diacetone alcohol or methyl cellosolve; a ketone such as acetone, methylethylketone or cyclohexanone; an amide such as N,N-dimethylformamide or N,N-dimethylacetamide; a sulfoxide such as dimethyl sulfoxide; an ether such as tetrahydrofurane, dioxane or ethyleneglycol monomethylether; an ester such as methyl acetate, ethyl acetate or butyl acetate; halogenated aliphatic hydrocarbon such as chloroform, methylene chloride, dichloroethane, dichloroethylene, carbon tetrachloride or trichloroethylene; or an aromatic solvent such as benzene, toluene, ligroin, xylene, monochlorobenzene or dichlorobenzene.

Also the binder can be suitably selected from a wide range of resins. Examples of such binder include cellulose esters such as nitrocellulose, cellulose phosphate, cellulose sulfate, cellulose acetate acetate, cellulose propionate, cellulose butyrate, cellulose myristate, cellulose palmitate, cellulose acetate propionate and cellulose acetate butyrate; cellulose ethers such as methyl cellulose, ethyl cellulose, propyl cellulose and butyl cellulose; vinylic resins such as polystyrene, polyvinyl chloride, polyvinyl acetate, polyvinyl butyral, polyvinyl acetal, polyvinyl alcohol and polyvinyl pyrrolidone; copolymer resins such as styrene-butadiene copolymers, styrene-acrylonitrile copolymers, styrene-butadiene-acrylonitrile copolymers and vinyl chloride-vinyl acetate copolymers; acrylic resins such as polymethyl methacrylate, polymethyl acrylate, polybutyl acrylate, polyacrylic acid, polymethacrylic acid, polyacryl amide and polyacrylonitrile; polyesters such as polyethylene terephthalate; polyarylate resins such as poly(4,4'-isopropylidenediphenylene-co-1,4-0-cyclohexylene dimethylene carbonate), poly(ethylenedioxy-3,3'-phenylenethiocarbonate), poly(4,4'-isopropylidenediphenylene carbonate-co-terephalate), poly(4,4'-isopropylidenediphenylene carbonate), poly(4,4'-sec-butylidenediphenylene carbonate) and poly(4,4'-isopropylidenediphenylene carbonate-block-oxyethylene); polyamides; polyimides; polyurethanes; epoxy resins; phenolic resins; polyolefins such as polyethylene, polypropylene, chlorinated polyethylene, polybutene and polyisobutylene; and elastomers such as natural rubber, isoprene rubber and chloroprene rubber. Also there may be suitably added an additive material other than the resin. Examples of such additive material includes natural waxes such as whale wax, bee wax, lanoline, carnauba wax, candellila wax, montan wax and celecin wax; petroleum waxes such as paraffin wax and microcrystalline wax; synthesized waxes such as oxidized wax, ester wax and Fischer-Tropsch wax; higher fatty acids such as lauric acid, myristic acid, palmitic acid, stearic acid and behenic acid; higher alcohols such as cateallyl alcohol and behenyl alcohol; esters such as cane sugar fatty acid esters and sorbitane fatty acid esters; and amides such as oleylamide.

The film forming property and the film stability of the recording layer can be improved by adding suitably, to the above-mentioned binder, a plasticizer such as dioctyl phthalate, dibutyl phthalate or tricresyl phosphate; an oil such as mineral oil or vegetable oil; a dispersant such as sodium alkylbenzenesolfonate or polyoxyethylenealkylphenylether; and other additives.

The coating can be achieved for example by dip coating, spray coating, spinner coating, bead coating, Mayer bar coating, blade coating, roller coating or curtain coating.

Figure 2:
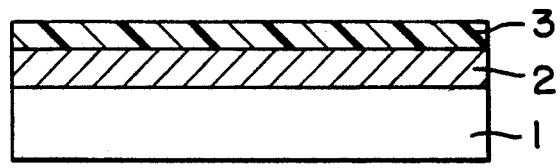

Furthermore, the optical recording medium of the present invention may be provided, on the recording layer 2, with a protective layer 3, as shown in FIG. 2, transparent to the recording and reading laser lights. Said protective layer 3 may be opaque if the light is projected through the substrate.

Figure 3:
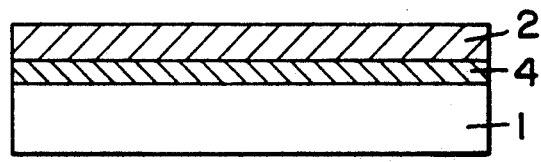

Also as shown in FIG. 3, a subbing layer 4 may be provided between the substrate 1 and the recording layer 2, in order to improve the adhesion and mechanical strength, and to reduce and heat loss by conduction to the substrate.

Figure 4:
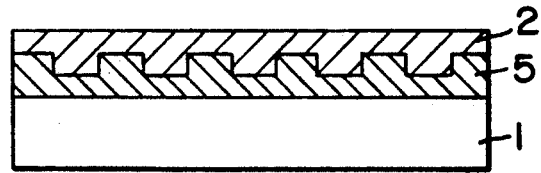

Also as shown in FIG. 4, the recording layer 2 may be formed on a substrate 1 having servo tracks 5 in relief patterns, and the recording medium for information recording and reproduction with guide tracks can thus be obtained.

Figure 5:
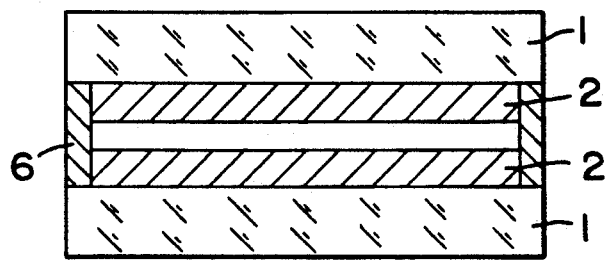
FIG. 5 is a cross-sectional view of an embodiment in which the optical recording medium of the present invention shown in FIG. 1 is constructed as a hollow structure.

Furthermore, as shown in FIG. 5, two optical recording media shown in FIG. 1 can be constructed as a hollow structure in which two recording layer face each other, with a spacer 6 therebetween.

Such structure improves the storage life since the recording layer 2 is sealed from the external atmosphere without a loss in the sensitivity and is protected from dust deposition, damage generation and contact with undesirable gasses. Also such structure is practical since both sides can be used for recording.

Figure 6:
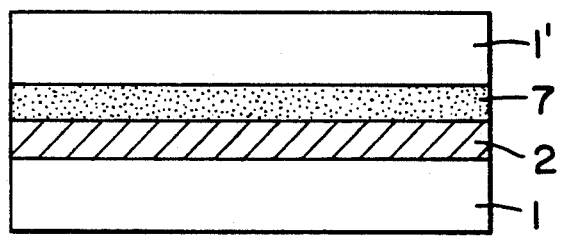
FIGS. 6 to 8 are cross-sectional views showing other embodiments of the optical recording medium of the present invention.

Furthermore, as shown in FIG. 6, another substrate 1' may be adhered onto the recording layer 2 by means of an adhesive layer 7, because the information recording on the recording medium with the free radical generating compound relies not on the pit formation in the recording layer but on the color fading of the dye compound contained therein. This structure is highly practical because of simple structure and improvement in the storage property.

Figure 7:
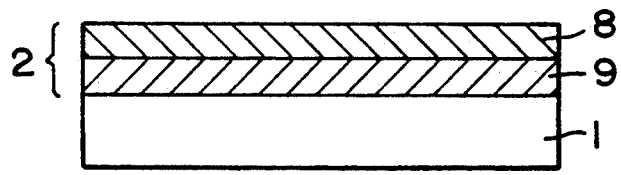
Figure 8:
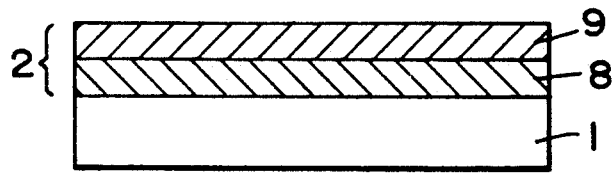

FIGS. 7 and 8 show still other embodiments of the optical recording medium of the present invention, wherein the recording layer 2 is composed of two layers, one being a light absorbing auxiliary layer 8 containing a dye compound having an absorption maximum in the vicinity of the wavelength of the recording light and causing photothermal conversion and color fading in the presence of free radicals, and the other being a free radical generating auxiliary layer 9 containing a free radical generating compound capable of generating free radicals through decomposition by the heat generated by the light absorption of said dye compound.

Each of said light absorbing auxiliary layer 8 and free radical generating auxiliary layer 9 may optionally contain the aforementioned additive materials such as binder, decomposition accelerator, dispersant, oil, plasticizer, filler, etc.

In this case, the content of the dye compound in said light absorbing auxiliary layer 8 is preferably in a range of 40 to 100%, since a content less than 40% cannot provide light absorption sufficient for thermal free radical generation in the recording layer and sufficient light reflection for the reproducing light. Also the content of the free radical generating compound on the auxiliary layer 9 is preferably in a range from 0.01 to 100%, since a content less than 0.01% cannot often provide sufficient improvement in the sensitivity because of the deficient number of the generated free radicals.

The preferred thickness of the light absorbing auxiliary layer 8 is in a range of 0.01 to 20 Å, and that of the free radical generating auxiliary layer is in a range of 0.01 to 20 Å.

When the recording layer of the above-explained optical recording medium of the present invention is irradiated with recording light, it is absorbed by said dye compound converted into heat energy, which decomposes the free radical generating compound, thus generating free radicals and destructing the conjugate system of the dye compound in the recording layer, thereby causing color fading thereof. At the same time there may occur other thermal deformations of the dye compound such as fusion, evaporation or coagulation.

The reading of information can be easily achieved by the difference in the light reflectance or transmittance between the area of color fading caused by said thermally generated free radicals and the unfaded area.

An optical recording medium employing only a dye compound having an absorption maximum in the vicinity of the wavelength of the recording light, or such dye compound in combination with a binder or other additive materials, can be satisfactorily used in combination with a semiconductor laser in a low-speed scanning where the recording energy is 100 mJ/cm$^2$ or higher, but such recording medium shows insufficient sensitivity or thermal deformation (spot formation) with a recording energy of 100 mJ/cm$^2$ or less in case of a high-speed scanning, encountered when the data transfer rate is increased without a buffer, or when an optical disk is rotated at a high constant angular velocity. In such case there will result a loss in the S/N ratio, because the difference in the reflectance or transmittance between the thermal faded area and the unfaded area becomes unclear, particularly in the peripheral area of the disk where the linear velocity is larger. However the optical recording medium of the present invention is free from such drawbacks due to the presence of the free radical generating compound which causes radical generation with a recording energy lower than for the spot formation in thermal deformation, thereby improving the sensitivity.

In the following there will be explained embodiment in which the recording layer contains a gas generating compound.

The compound, generating gas through decomposition by the heat generated by the absorption of recording light by the dye compound, should preferably satisfy conditions that (1) the gas liberation takes within a short time with a controllable rate, (2) the decomposition temperature is adjustable, and (3) the amount of liberated gas is constant and large.

Said gas generating compound should be suitably selected in consideration of the decomposition temperature and decomposition speed, and can be an organic compound or an inorganic compound. Examples of such organic compound include nitroso compounds such as dinitrosopentamethylene tetramine (DPT) and N,N'-dimethyl-N,N'-dinitrosoterephthalamide (DMDNTA); sulfonyl hydrazide compounds such as benzene sulfonyl hydrazide (BSH), p-toluene sulfonylhydrazide (TSH), diphenylsulfone-S,S'-disulfonylhydrazide (DPSDSH) and 4,4'-oxybisbenzene sulfonylhydrazide (OBSH); azo compounds such as azo-dicarbonamide (ADCA), azobisisobutyronitrile (AIBN), diazoaminobenzene (DAB) and barium azodicarboxylate; trihydrazinotriazine; p-toluene sulfonyl semicarbazide; 4,4'-oxybisbenzene sulfonyl semicarbazide and mixtures thereof. Also examples of such inorganic compound include sodium bicarbonate, ammonium carbonate, ammonium bicarbonate, ammonium nitrite, peroxides and mixtures thereof.

Among the above-mentioned gas generating compounds, organic ones, involving exothermic decomposition, are preferred since the quantity of generated gas tends to be constant and the relation between the amount of addition and the quantity of generated gas is easily predictable, as the decomposition proceeds rapidly once a predetermined temperature is reached.

On the other hand the inorganic compounds often decompose gradually due to endothermic reaction, and the quantity of gas generation should preferably be controlled in such case.

The content of the gas generating compound in the recording layer is selected in a range of 0.1 to 60%, preferably 1 to 50%, since a content less than 0.1% cannot provide satisfactry improvement in the sensitivity because of the deficient quantity of the generated gas, while a content exceeding 60% cannot provide sufficient temperature increase in the recording layer in response to light, due to the insufficient quantity of the dye compound therein, though said temperature increase depends on the absorption coefficient of said compound at the wavelength of the light.

A suitable additive material may be added to the gas generating compound, particularly organic one, in order to regulate the decomposition temperature. The additive materials for accelerating the decomposition and for suppressing the decomposition can be same as those employable for the free radical generating compounds. Also the method of forming the recording layer, and the resin, solvent etc. employable in forming the recording layer can be same as those in the recording layer containing the free radical generating compound. Furthermore, the recording medium can assume one of the structures shown in FIGS. 1 to 7, as in the recording medium employing the free radical generating compound. However, in a gas generating auxiliary layer corresponding to the free radical generating auxiliary layer 9, the content of the gas generating compound is preferably in a range of 0.1 to 100%, since a content less than 0.1% cannot provide sufficient improvement in the sensitivity due to the insufficient amount of the generated gas.

The preferred thickness of the light absorbing auxiliary layer is in a range of 0.01 to 20 Å, and that of the deformation recording auxiliary layer is in a range of 0.01 to 20 Å.

When the recording layer of the optical recording medium containing a gas generating compound is irradiated with recording light, it is absorbed by the dye compound, the light energy is converted into heat energy, and thermal deformation of the recording layer occurs by generation of gas due to deformation of the gas generating compound by the above heat. By the above, the information is recorded. At the same time, there may be occur other thermal deformation of the dye compound such as fusion, evaporation or coagulation.

The recording of information can be easily achieved by the difference in the light reflectance between the thermally deformed area and the non-deformed area.

In the following the present invention will be further clarified by examples and reference examples.

EXAMPLES 1 TO 4 AND REFERENCE EXAMPLES 1 TO 4

A dye compound and a free radical generating compound capable of generating free radicals by thermal decomposition, listed in Table 1, were mixed with a mixing ratio of 9:1, dissolved or dispersed in dichloroethane, coated with a spinner on a glass disk substrate of a thickness of 1.2 mm and a diameter of 20 cm and dried to obtain a recording layer of a thickness of 1000 Å. In this manner there were prepared eight optical recording media (Examples 1 to 4 and Reference Examples 1 to 4).

TABLE 1

| | Dye compound ($\lambda_{max}$:nm) | Free radical generating compd. |
|---|---|---|
| Example 1 | [structure: bis-indolium pentamethine cyanine with H₃C, CH₃ gem-dimethyl groups, N-Et, ClO₄⁻ counterion] (800) | AIBN |
| Ref. Ex. 1 | same as in Example 1 | — |
| Example 2 | [structure: (Et)₂N-aryl groups with C=C—C—C=C—C chain, (Et)₂NClO₄⁻, ⊕N(Et)₂, N(Et)₂] (860) | AIBN |
| Ref. Ex. 2 | same as in Example 2 | — |

TABLE 1-continued

| | Dye compound ($\lambda_{max}$:nm) | Free radical generating compd. |
|---|---|---|
| Example 3 | 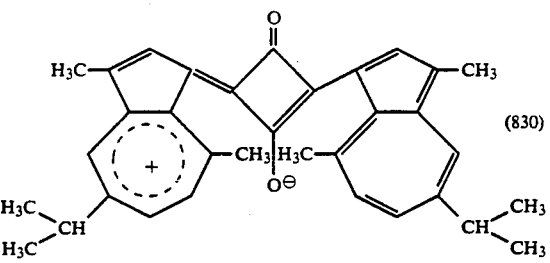 (830) | Benzoyl peroxide |
| Ref. Ex. 3 | same as in Example 3 | — |
| Example 4 | 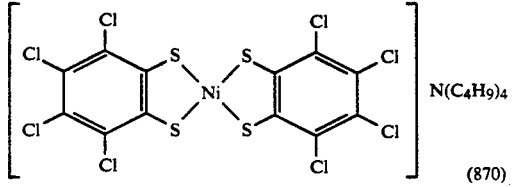 (870) | Benzoyl peroxide |
| Ref. Ex. 4 | same as in Example 4 | — |

EXAMPLES 5 TO 8 AND REFERENCE EXAMPLES 5 TO 8

A dye compound, listed in Table 2, was dissolved in dichloroethane, coated on a glass disk substrate of a thickness of 1.2 mm and a diameter of 20 cm with a spinner and dried to form a first recording layer of a thickness of 750 Å. Then, a free radical generating compound and nitrocellulose as binder were dissolved or dispersed with a mixing ratio of 9:1 in ethanol/n-hexane mixture, then coated and dried on the first recording layer in a similar manner to form a second recording layer of a thickness of 750 Å. In this manner there were obtained eight optical recording media (Examples 5 to 8 and Reference Examples 5 to 8).

TABLE 2

| | First recording layer, dye compound ($\lambda_{max}$:nm) | Second recording layer: free radical generating compd. |
|---|---|---|
| Example 5 | 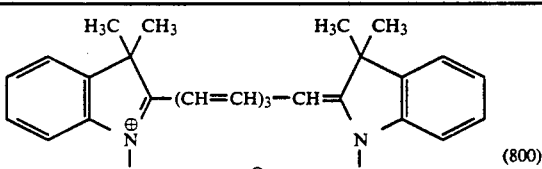 (800) | AIBN |
| Ref. Ex. 5 | same as in Example 5 | — |
| Example 6 | 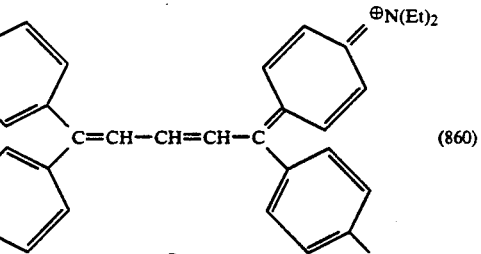 (860) | AIBN |
| Ref. Ex. 6 | same as in Example 6 | — |

TABLE 2-continued

| | First recording layer, dye compound ($\lambda_{max}$:nm) | Second recording layer: free radical generating compd. |
|---|---|---|
| Example 7 | 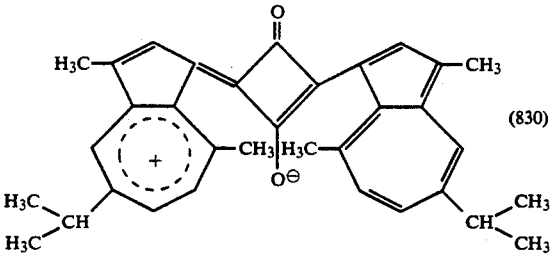 (830) | Benzoyl peroxide |
| Ref. Ex. 7 | same as in Example 7 | — |
| Example 8 | 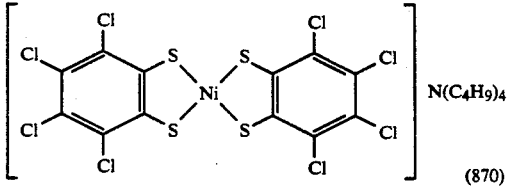 (870) | Benzoyl peroxide |
| Ref. Ex. 8 | same as in Example 8 | — |

EXAMPLES 9 TO 12 AND REFERENCE EXAMPLES 9 TO 12

A free radical generating compound, listed in Table 3, and nitrocellulose as binder were dissolved or dispersed with a ratio of 9:1 in dichloroethane, then coated with a spinner on a glass disk substrate of a thickness of 1.2 mm and a diameter of 20 cm and dried to obtain a first recording layer of a thickness of 750 Å. Then a dye compound was dissolved in methyl cellosolve, then coated and dried on the first recording layer in a similar manner to obtain a second recording layer of a thickness of 750 Å. In this manner there were obtained eight optical recording media (Examples 9 to 12 and Reference Examples 9 to 12).

TABLE 3

| | 1st. rec. layer, free radical gen. compound | 2nd recording layer, dye compound ($\lambda_{max}$:nm) |
|---|---|---|
| Example 9 | AIBN | 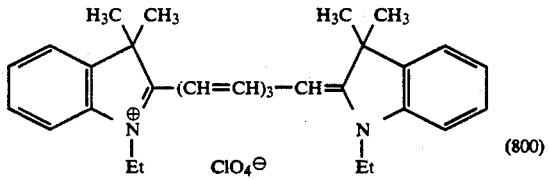 (800) |
| Ref. Ex. 9 | — | same as in Example 9 |
| Example 10 | AIBN | 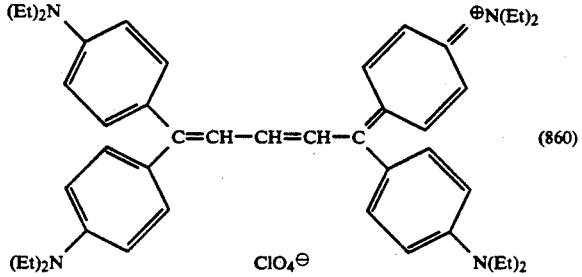 (860) |
| Ref. Ex. 10 | — | same as in Example 10 |

TABLE 3-continued

| | 1st. rec. layer, free radical gen. compound | 2nd recording layer, dye compound ($\lambda_{max}$:nm) |
|---|---|---|
| Example 11 | Benzoyl peroxide | [structure] (830) |
| Ref. Ex. 11 | — | same as in Example 11 |
| Example 12 | Benzoyl peroxide | [Ni complex structure] N(C₄H₉)₄ (870) |
| Ref. Ex. 12. | — | same as in Example 12 |

Each of the optical recording media explained above was mounted on a turntable, then rotated at a velocity of 1800 rpm and subjected to recording of pulses of a frequency of 1 MHz projected in a track form by a Ga-Al-As semiconductor laser (wavelength 830 nm) through the substrate. Table 4 summarizes the recording sensitivity or the energy required for the formation of faded areas or pits observable under an optical microscope.

TABLE 4

| | Record. sens. (mJ/cm$^2$) | | Record. sens. (mJ/cm$^2$) |
|---|---|---|---|
| Example 1 | 36 | Example 7 | 31 |
| Ref. Ex. 1 | 59 | Ref. Ex. 7 | 51 |
| Example 2 | 33 | Example 8 | 40 |
| Ref. Ex. 2 | 56 | Ref. Ex. 8 | 60 |
| Example 3 | 30 | Example 9 | 37 |
| Ref. Ex. 3 | 52 | Ref. Ex. 9 | 58 |
| Example 4 | 38 | Example 10 | 33 |
| Ref. Ex. 4 | 61 | Ref. Ex. 10 | 55 |
| Example 5 | 38 | Example 11 | 31 |
| Ref. Ex. 5 | 58 | Ref. Ex. 11 | 51 |
| Example 6 | 34 | Example 12 | 39 |
| Ref. Ex. 6 | 55 | Ref. Ex. 12 | 60 |

As explained in the foregoing, the optical recording medium of the present invention can provide an excellent sensitivity, due to the use of a recording layer containing a dye compound having an absorption maximum in the vicinity of the wavelength of the recording laser light and a free-radical generating compound capable of generating free radicals through decomposition by the heat generated by the absorption of the recording light by said dye compound.

EXAMPLES 13 TO 16 AND REFERENCE EXAMPLES 13 TO 16

A dye compound and a gas generating compound capable of generating gas by thermal decomposition, listed in Table 5, were dissolved or dispersed, with a ratio of 8:2, in dichloroethane, then coated with a spinner on a glass disk substrate of a thickness of 1.2 mm and a diameter of 20 cm and dried to obtain a recording layer of a thickness of 1000 Å. In this manner there were obtained eight optical recording media (Examples 13 to 16 and Reference Examples 13 to 16).

TABLE 5

| | Dye compound ($\lambda_{max}$:nm) | Gas generating compound |
|---|---|---|
| Example 13 | [indolenine cyanine dye structure with (CH=CH)₃—CH, ClO₄⁻] (800) | AIBN |
| Ref. Ex. 13 | same as in Example 13 | — |

TABLE 5-continued

| | Dye compound (λ$_{max}$:nm) | Gas generating compound |
|---|---|---|
| Example 14 | 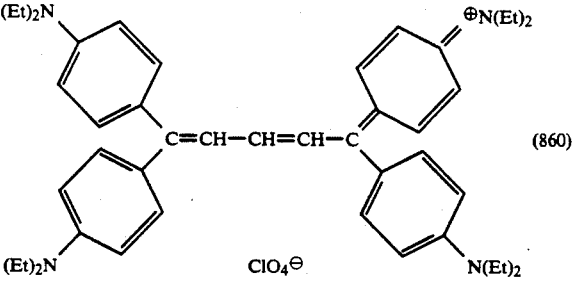 (860) | TSH |
| Ref. Ex. 14 | same as in Example 14 | — |
| Example 15 | 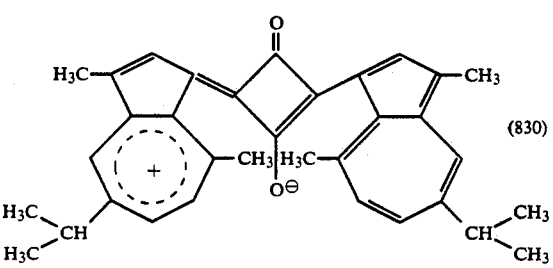 (830) | ADCA |
| Ref. Ex. 15 | same as in Example 15 | — |
| Example 16 | 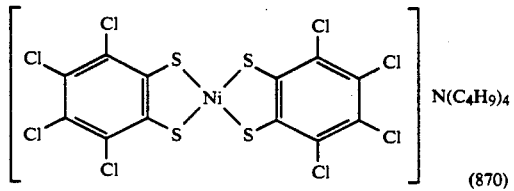 (870) | DPT |
| Ref. Ex. 16 | same as in Example 16 | — |

EXAMPLES 17 TO 20 AND REFERENCE EXAMPLES 17 TO 20

A dye compound, shown in Table 6, was dissolved in dichloroethane, coated with a spinner on a glass disk substrate of a thickness of 1.2 mm and a diameter of 20 cm and dried to obtain a first recording layer of a thickness of 750 Å. Then, a gas generating compound and nitrocellulose as binder, in a ratio of 9:1, were dissolved or dispersed in ethanol/n-hexane solvent mixture, then coated and dried on said first recording layer in a similar manner to obtain a second recording layer of a thickness of 750 Å. In this manner there were obtained eight optical recording media (Examples 17 to 20 and Reference Examples 17 to 20).

TABLE 6

| | First recording layer, dye compound (λ$_{max}$:nm) | 2nd record. layer, gas generating compound |
|---|---|---|
| Example 17 | 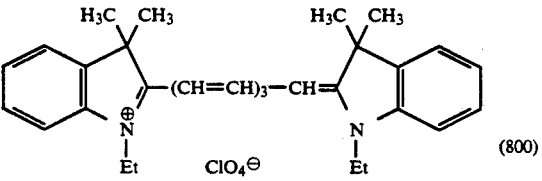 (800) | AIBN |
| Ref. Ex. 17 | same as in Example 17 | — |

TABLE 6-continued

| | First recording layer, dye compound ($\lambda_{max}$:nm) | 2nd record. layer, gas generating compound |
|---|---|---|
| Example 18 | 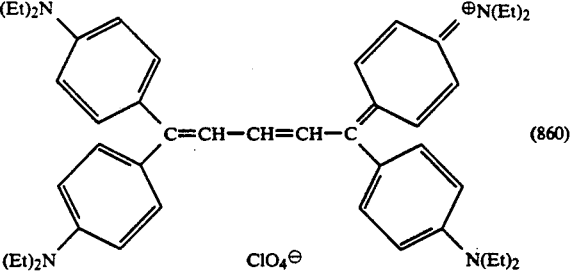 (860) | TSH |
| Ref. Ex. 18 | same as in Example 18 | — |
| Example 19 | 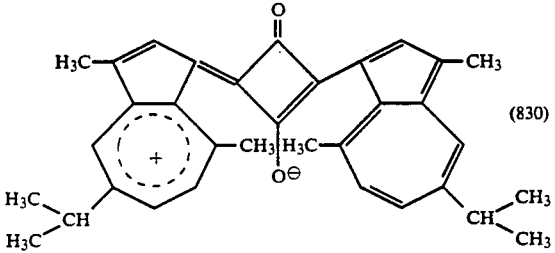 (830) | ADCA |
| Ref. Ex. 19 | same as in Example 19 | — |
| Example 20 | 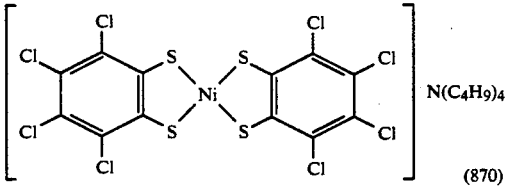 (870) | DPT |
| Ref. Ex. 20 | same as in Example 20 | — |

EXAMPLES 21 TO 24 AND REFERENCE EXAMPLES 21 TO 24

According to the combinations listed in Table 7, a gas generating compound and nitrocellulose as binder were dissolved or dispersed, with a ratio of 9:1, in dicloroethane, then coated with a spinner on a glass disk substrate of a thickness of 1.2 mm and a diameter of 20 cm and dried to obtain a first recording layer of a thickness of 750 Å. Then a dye compound was dissolved in methyl cellosolve, then coated and dried on the first recording layer in a similar manner to obtain a second recording layer of a thickness of 750 Å. In this manner there were prepared eight optical recording media (Examples 21 to 24 and Reference Examples 21 to 24).

TABLE 7

| | 1st rec. layer, gas gen. compd. | 2nd recording layer, dye compound ($\lambda_{max}$:nm) |
|---|---|---|
| Example 21 | AIBN | 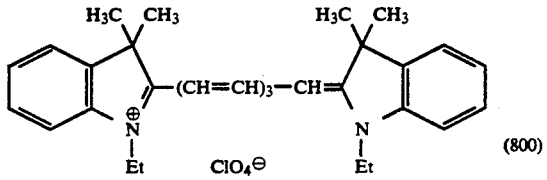 (800) |
| Ref. Ex. 21 | — | same as in Example 21 |

TABLE 7-continued

| | 1st rec. layer, gas gen. compd. | 2nd recording layer, dye compound ($\lambda_{max}$:nm) |
|---|---|---|
| Example 22 | TSH | [structure with (Et)$_2$N groups, C=CH—CH=CH—C, ClO$_4^\ominus$] (860) |
| Ref. Ex. 22 | — | same as in Example 22 |
| Example 23 | ADCA | [azulene-based structure with H$_3$C and CH$_3$ groups, O$^\ominus$] (830) |
| Ref. Ex. 23 | — | same as in Example 23 |
| Example 24 | DPT | [Ni complex with Cl-substituted benzene dithiolate ligands] N(C$_4$H$_9$)$_4$ (870) |
| Ref. Ex. 24 | — | same as in Example 24 |

Each of the optical recording media explained above was mounted on a turntable, rotated at a velocity of 1800 rpm and subjected to the recording of pulses of 1 MHz emitted in a track form by a Ga-Al-As semiconductor laser (wavelength 830 nm) through the substrate. Table 8 summarizes the recording sensitivity, or the energy required for forming pits observable under as optical microscope.

TABLE 8

| | Record. sens. (mJ/cm$^2$) | | Record. sens. (mJ/cm$^2$) |
|---|---|---|---|
| Example 13 | 45 | Example 19 | 43 |
| Ref. Ex. 13 | 59 | Ref. Ex. 19 | 51 |
| Example 14 | 42 | Example 20 | 49 |
| Ref. Ex. 14 | 56 | Ref. Ex. 20 | 60 |
| Example 15 | 40 | Example 21 | 46 |
| Ref. Ex. 15 | 52 | Ref. Ex. 21 | 58 |
| Example 16 | 47 | Example 22 | 43 |
| Ref. Ex. 16 | 61 | Ref. Ex. 22 | 55 |
| Example 17 | 47 | Example 23 | 42 |
| Ref. Ex. 17 | 58 | Ref. Ex. 23 | 51 |
| Example 18 | 44 | Example 24 | 49 |
| Ref. Ex. 18 | 55 | Ref. Ex. 24 | 60 |

What is claimed is:

1. An optical recording method which comprises projecting a recording light onto an optical recording medium, provided with a recording layer containing
   (a) a dye compound capable of absorbing said recording light and
   (b) a free radical generating compound capable of generating free radicals through decomposition by heat generated by the absorption of the recording light by the dye compound, wherein said radical generating compound is a compound selected from the group consisting of azo compounds, diacryl peroxides, dialkyl peroxides, hydroperoxides, sulfur compounds, carbonyl compounds, halogen compounds, reducing dyes, organometallic compounds and persulfates;

thereby causing the free radicals generated by said free radical generating compound to fade the color of said dye compound and thus recording information.

2. An optical recording method according to claim 1, wherein the content of said dye compound in said recording layer is within a range from 40 to 99.99 wt. %.

3. An optical recording method according to claim 1, wherein the content of said free radical generating compound in said recording layer is within a range from 0.01 to 60 wt. %.

4. An optical recording method according to claim 1, wherein said dye compound has an absorption peak within a wavelength range from 700 to 850 nm.

5. An optical recording method according to claim 1, wherein said radical generating compound contains at least one of azo-bis-isobutyronitrile and benzoyl peroxide.

6. An optical recording method which comprises projecting a recording laser light onto an optical recording medium, provided with a recording layer which is composed of a laminated structure of
   (a) a light absorbing auxiliary layer containing a dye compound and
   (b) a free radical generating auxiliary layer containing a free radical generating compound capable of generating free radicals through decomposition by heat generated by the absorption of the recording light by the dye compound, wherein said radical generating compound is a compound selected from the group consisting of azo compounds, diacryl peroxides, dialkyl peroxides, hydroperoxides, sulfur compounds, carbonyl compounds, halogen compounds, reducing dyes, organometallic compounds and persulfates;
thereby causing the free radicals to fade the color of said dye compound and thus recording information.

7. An optical recording method which comprises projecting a recording laser light onto an optical recording medium, provided with a recording layer containing a
   (a) a dye compound capable of absorbing said recording light and
   (b) a free radical generating compound capable of generating free radicals through decomposition by heat generated by the absorption of the recording light by the dye compound, wherein said radical generating compound is a compound selected from the group consisting of azo compounds, diacryl peroxides, dialkyl peroxides, hydroperoxides, sulfur compounds, carbonyl compounds, halogen compounds, reducing dyes, organometallic compounds and persulfates;
thereby causing the free radicals to fade the color of said dye compound and thus recording information without removing the recording layer projected by the recording laser light.

8. An optical recording method according to claim 6, wherein said radical generating compound contains at least one of azo-bis-isobutyronitrile and benzoyl peroxide.

9. An optical recording method according to claim 7, wherein said radical generating compound contains at least one of azo-bis-isobutyronitrile and benzoyl peroxide.

* * * * *

UNITED STATES PATENT AND TRADEMARK OFFICE
CERTIFICATE OF CORRECTION

PATENT NO. : 5,185,233
DATED : February 9, 1993
INVENTOR(S) : SANTO

It is certified that error appears in the above-indentified patent and that said Letters Patent is hereby corrected as shown below:

ON THE TITLE PAGE:
<u>AT [60] Related U.S. Application Data</u>

"continuation" should read --division--.

<u>Column 1</u>

Line 6, "continuation" should read --division--.

Line 21, "1 microns" should read --1 micron--.

Line 65, "has" should read --have--.

<u>COLUMN 7</u>

Line 21, "and" (second occurrence) should be deleted.

<u>COLUMN 9</u>

Line 25, "satisfactry" should read --satisfactory--.

<u>COLUMN 10</u>

Line 22, "be" should be deleted.

Example 2, "$(Et)_2NClO_4^{\ominus}$" should read --$(Et)_2N\ ClO_4^{\ominus}$--.

<u>COLUMN 21</u>

Line 48, "as" should read --an--.

UNITED STATES PATENT AND TRADEMARK OFFICE
CERTIFICATE OF CORRECTION

PATENT NO. : 5,185,233
DATED : February 9, 1993
INVENTOR(S) : SANTO

It is certified that error appears in the above-indentified patent and that said Letters Patent is hereby corrected as shown below:

COLUMN 22

Line 53, "persulfates;" should read --persulfate,--.

COLUMN 23

Line 19, "persulfates;" should read --persulfates,--

Line 25, "a" should be deleted.

COLUMN 24

Line 12, "persulfates;" should read --persulfates,--.

Signed and Sealed this

Eighth Day of March, 1994

Attest:

BRUCE LEHMAN

Attesting Officer   Commissioner of Patents and Trademarks